(12) United States Patent
Iwakiri et al.

(10) Patent No.: US 7,012,550 B2
(45) Date of Patent: Mar. 14, 2006

(54) PARKING ASSIST APPARATUS AND PARKING ASSIST METHOD FOR VEHICLE

(75) Inventors: Hideyuki Iwakiri, Tajimi (JP); Hisashi Satonaka, Susono (JP); Yuichi Kubota, Okazaki (JP); Tomohiko Endo, Toyota (JP); Akira Matsui, Toyota (JP); Toru Sugiyama, Toyota (JP); Seiji Kawakami, Susono (JP); Katsuhiko Iwazaki, Shizuoka-ken (JP); Hiroaki Kataoka, Susono (JP); Yuu Tanaka, Aichi-ken (JP); Yoshifumi Iwata, Anjo (JP)

(73) Assignees: Toyota Jidosha Kabushiki Kaisha, Toyota (JP); Aisin Seiki Kabushiki Kaisha, Kariya (JP)

(*) Notice: Subject to any disclaimer, the term of this patent is extended or adjusted under 35 U.S.C. 154(b) by 135 days.

(21) Appl. No.: 10/808,362

(22) Filed: Mar. 25, 2004

(65) Prior Publication Data

US 2004/0249564 A1  Dec. 9, 2004

(30) Foreign Application Priority Data

Mar. 27, 2003  (JP) .......................... 2003-088651

(51) Int. Cl.
G08G 1/14  (2006.01)
(52) U.S. Cl. ................... 340/932.2; 340/937
(58) Field of Classification Search ............ 340/932.2, 340/436, 437, 937, 935; 701/23, 28
See application file for complete search history.

(56) References Cited

U.S. PATENT DOCUMENTS

| | | | | |
|---|---|---|---|---|
| 5,757,359 A * | 5/1998 | Morimoto et al. | ........... | 345/156 |
| 6,282,493 B1 * | 8/2001 | Kitagawa et al. | ........... | 701/211 |
| 6,483,442 B1 * | 11/2002 | Shimizu et al. | ........... | 340/932.2 |
| 6,487,481 B1 * | 11/2002 | Tanaka et al. | ........... | 701/41 |
| 6,621,421 B1 * | 9/2003 | Kuriya et al. | ........... | 340/932.2 |
| 6,704,653 B1 * | 3/2004 | Kuriya et al. | ........... | 701/301 |

FOREIGN PATENT DOCUMENTS

| | | |
|---|---|---|
| EP | A 1 199 225 | 4/2002 |
| EP | A 1 297 999 | 4/2003 |
| GB | A 2 398 048 | 8/2004 |
| JP | A 11-208420 | 8/1999 |

* cited by examiner

*Primary Examiner*—Daryl C Pope
(74) *Attorney, Agent, or Firm*—Oliff & Berridge, PLC

(57) ABSTRACT

Parking assist apparatus and method cause a vehicle driver to set a target parking position in which the vehicle is to be parked by prompting the driver to specify the position of a parking space frame in the screen of a touch display by touch-operating arrow button switches shown in the screen, and then calculate a path to the target parking position. If a path to the target parking position is not generated by calculation, the arrow button switches for moving the parking space frame in such directions that a path will not be generated (i.e., the vehicle cannot be parked), among all the arrow button switches, are made non-displayed or are displayed dimmer than the other arrow button switches, and are disabled.

20 Claims, 10 Drawing Sheets

PARKING ASSIST APPARATUS AND PARKING ASSIST METHOD FOR VEHICLE

INCORPORATION BY REFERENCE

The disclosure of Japanese Patent Application No. 2003-088651 filed on Mar. 27, 2003 including the specification, drawings and abstract is incorporated herein by reference in its entirety.

BACKGROUND OF THE INVENTION

1. Field of the Invention

The invention relates to a parking assist apparatus and a parking assist method. More particularly, the invention relates to a parking assist apparatus and a parking assist method in which a target parking position of a vehicle is set in accordance with an operation performed by a driver, and parking assist is performed on the basis of a path to the set target parking position.

2. Description of the Related Art

A known parking assist apparatus as described in Japanese Patent Application Laid-Open Publication No. 11-208420, sets a target parking position in accordance with a positioning operation of a setting display displayed on an image showing surroundings of a vehicle, and calculates a path to the set target parking position, and guides the vehicle along the path generated through calculation. In such a parking assist apparatus, if the set target parking position is changed by a positioning operation of the setting display on the displayed image after the guidance of the vehicle to the target parking position along the calculated path has begun, a path to the post-change target parking position is calculated, and the vehicle is guided along a path generated through calculation. Therefore, according to the parking assist apparatus, if a target parking position is reset, a vehicle can be guided along a new path.

However, in some cases, calculation of a path to a set or reset target parking position of a vehicle cannot generate an effective path along which the vehicle is to be moved. In such an event, since it is impossible to guide the vehicle to the target parking position, the target parking position needs to be changed by a vehicle driver performing a positioning operation of the setting display in the displayed image. If, in such a case, the position of the setting display can be moved in all directions on the display image, a setting operation to a region where the parking of the vehicle is impossible is allowed to be performed. Therefore it may be difficult for a driver to understand a necessary positioning operation of the setting display in order to set a target parking position that assures generation of a path thereto.

SUMMARY OF THE INVENTION

It is an object of the invention to provide a parking assist apparatus and a parking assist method capable of allowing a vehicle driver to easily accomplish an operation of setting a target parking position where the vehicle is to be parked.

In accordance with a first aspect of the invention, a parking assist apparatus includes a display device that displays an actual image of surroundings of the vehicle; a setting device which displays a setting display that indicates a target parking position of the vehicle on the actual image of the display device, and which sets the target parking position of the vehicle in accordance with a positioning operation of the setting display; and an operation aid device that aids in the positioning operation of the setting display in a direction to a parking-possible region when the target parking position is to be set by the setting device.

According to the first aspect of the invention, when a target parking position where the vehicle is to be parked is to be set, what brings about a positioning operation of the setting display shown on an actual image in the direction to a parking-possible region is aided. That is, what brings about a positioning operation of the setting display in the direction to a parking-impossible region is not aided. If the setting display on an actual image is positionally operated in the direction to a parking-impossible region, a path to the thus-set target parking position will not be generated, and therefore the vehicle cannot be parked in the target parking position. Hence, it is unnecessary to let a vehicle driver to perform such a positioning operation. Therefore, according to the invention, it becomes easier for a vehicle driver to understand which direction to operate the setting display at the time of setting a target parking position, so that the vehicle driver can easily accomplish the operation of setting a target parking position.

In the first aspect of the invention, the setting device may calculate a path to the target parking position; and the operation aid device may aid in the positioning operation of the setting display in the direction to the parking-possible region when the target parking position is to be reset after it is determined that parking the vehicle in the target parking position is difficult through calculation of the path to the target parking position set by the setting device. Therefore, it becomes easy for a vehicle driver to understand the direction in which to operate the setting display at the time of setting a target parking position, so that the vehicle driver can easily accomplish the operation.

In the above-described aspect, the setting device may perform the calculation of the path at every predetermined time.

In the above-described aspect, the setting device may perform the calculation of the path every time the target parking position is changed by the positioning operation of the setting display.

In the above-described aspect, the setting device may have a switch for starting the calculation of the path.

In the above-described aspect, the operation aid device may make effective only a function of an operating switch of moving the position of the setting display in the direction to the parking-possible region, the operating switch being operated by a vehicle driver to move the position of the setting display. Therefore, the operation of an operating switch of moving the setting display in the direction to a parking-impossible region is made ineffective, so that the vehicle driver is allowed to perform only the operation of the operating switch of moving the setting display in the direction of a parking-possible region. Hence, the operation can easily be accomplished.

In the above-described aspect, a plurality of operating switches that are operated by the vehicle driver to move the position of the setting display may be displayed in a display screen corresponding to directions in which the position of the setting display is moved. Furthermore, among the plurality of operating switches, at least one operating switch for moving the position of the setting display in the direction to the parking-possible region may be displayed by the operation aid device with a more emphasis than at least one operating switch for moving the position of the setting display in a direction to a parking-impossible region. This arrangement visually prompts a vehicle driver to operate an operating switch for moving the display setting in the direction to a parking-possible region, so that the operation of the operating switch can easily be accomplished.

In the above-described aspect, the operation aid device may display, on the actual image, the at least one operating switch for moving the position of the setting display in the direction to the parking-possible region in a first color, and the at least one operating switch for moving the position of the setting display in the direction to the parking-impossible region in a second color that is different from the first color.

In the above-described aspect, the operation aid device may disable an operation of the at least one operating switch for moving the position of the setting display in the direction to the parking-impossible region.

In the above-described aspect, the operation aid device may make effective the disabled operation of the at least one operating switch after the position of the setting display is moved to a parking-possible position.

In the above-described aspect, the operation aid device may erase the at least one operating switch for moving the position of the setting display in the direction to the parking-impossible region from the actual image.

In the above-described aspect, the operation aid device may superimpose a synthesized image for discriminating the parking-possible region and a parking-impossible region, on the actual image. This arrangement allows a vehicle driver to visually distinguish the parking-possible region and the parking-impossible region, so that necessary operation can easily be accomplished.

In the above-described aspect, the operation aid device may display, on the actual image, an expected locus of an inner turning wheel which is expected to occur if the vehicle is moved with a maximum steering angle of the vehicle.

In the above-described aspect, the operation aid device may display the parking-possible region and the parking-impossible region in different colors.

In the above-described aspect, if it is determined that it is difficult to park the vehicle in the target parking position set by the setting device, the operation aid device may output explanatory information that aids in the positioning operation of the setting display in the direction to the parking-possible region in accordance with the set target parking position. Therefore, the reason why the parking of the vehicle is difficult or the direction of a target parking position that should be reset can be explained in characters or voice to a vehicle driver.

In the above-described aspect, if it is determined that it is difficult to park the vehicle in the target parking position set by the setting device, the operation aid device may indicate to a vehicle driver i) at least one of a reason why it is difficult to park the vehicle in the target parking position, and ii) an operation of the setting display for setting the target parking position at a parking-possible position.

In the above-described aspect, the operation aid device may display the setting display in a first color if it is determined that it is difficult to park the vehicle in the target parking position, and may display the setting display in a second color that is different from the first color if it is determined that it is possible to park the vehicle in the target parking position.

In the above-described aspect, the setting display may include a parking space frame that is displayed on the actual image.

In accordance with a second aspect of the invention, a parking assist apparatus includes display means for displaying an actual image of surroundings of the vehicle; setting means for displaying a setting display that indicates a target parking position of the vehicle on the actual image of the display means, and setting the target parking position of the vehicle in accordance with a positioning operation of the setting display; and operation aid means for aiding in the positioning operation of the setting display in a direction to a parking-possible region when the target parking position is to be set by the setting means.

In accordance with a third aspect of the invention, a parking assist method includes a first step of displaying an actual image of surroundings of the vehicle, a second step of setting a target parking position where the vehicle is to be parked in accordance with a positioning operation of a setting display shown on the actual image of surroundings of the vehicle, and a third step of aiding in the positioning operation of the setting display in a direction to a parking-possible region when the target parking position is to be set.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
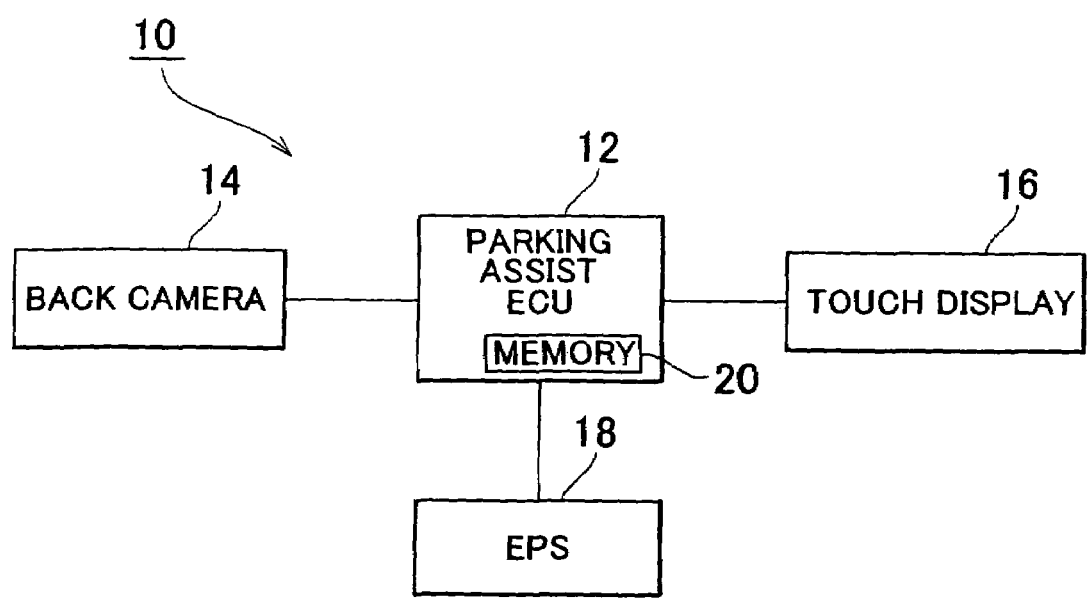
FIG. 1 is a diagram illustrating the system construction of a parking assist apparatus installed in a vehicle in accordance with an embodiment of the invention.

FIG. 1 is a diagram illustrating a system construction of a parking assist apparatus 10 installed in a vehicle in accordance with an embodiment of the invention. The parking assist apparatus 10 for a vehicle of this embodiment, in the event of parking of the vehicle, for example, garage parking, parallel parking or the like, executes a control of automatically steering the vehicle without a steering operation performed by a driver of the vehicle so as to move the vehicle along a path to a target parking position set by the vehicle driver (hereinafter, referred to as "parking assist control").

As shown in FIG. 1, the parking assist apparatus 10 has a parking assist-purpose electronic control unit (hereinafter, referred to as "parking assist ECU") 12 that controls a back camera 14, a touch display 16 and an EPS (electronic power steering) 18. The back camera 14 is connected to the parking assist ECU 12. The back camera 14 is disposed at the center of a rear portion of a vehicle body, and takes images of a region that extends rearward of the vehicle in a predetermined angle. Image information acquired by the back camera 14 is supplied to the parking assist ECU 12.

The touch display 16 is also connected to the parking assist ECU 12. The touch display 16 is disposed at such a position that the touch display 16 can be seen and operated by a vehicle driver (e.g., at the center of an instrument panel). The parking assist ECU 12 displays the images taken by the back camera 14 in the touch display 16 in a right-left inverted fashion, for example, if the gear shift position of the vehicle is the reverse position. In accordance with the command from the parking assist ECU 12, the touch display 16 displays, in its display screen, images of the surroundings rearward of the vehicle which are taken by the back camera 14. The touch display 16 displays an auxiliary line, a frame, etc., for the parking assist control in accordance with a command from the parking assist ECU 12 in a superimposed fashion on the image taken by the back camera 14.

The touch display 16 has a touch operating portion of a pressure sensitive type, a temperature sensitive type, or the like, which can be operated by a vehicle driver. The touch operating portion is formed by a plurality of hierarchical switches, and is displayed in the screen in accordance with commands from the parking assist ECU 12. The parking assist ECU 12 detects touch operation performed on the touch operating portion by a vehicle driver, and executes a process corresponding to the content of the touch operating portion. The touch operating portion includes a switch for starting an garage parking mode as a parking assist control, a switch for starting a parallel parking, arrow button switches for setting a target parking position where a driver intends to park the vehicle.

An electric power steering device (hereinafter, referred to as "EPS") 18 is connected to the parking assist ECU 12. The EPS includes a torque sensor for detecting the steering torque that is applied to a steering shaft by the steering operation performed by a vehicle driver, a steering angle sensor for detecting the steering angle of the steering shaft, and an electric motor for applying torque to the steering shaft. The EPS 18 causes the electric motor to produce torque in order to assist driver's steering operation, and causes the electric motor to produce torque in order to steer the vehicle without driver's steering operation during the parking of the vehicle, for example, garage parking, parallel parking, etc., performed by the parking assist control.

The EPS 18 supplies an instruction regarding the detected steering shaft angle information to the parking assist ECU 12. The parking assist ECU 12 supplies an instruction regarding a target steering angle to be reached by the steering shaft as described below during execution of the parking assist control. The EPS 18, supplied with the instruction regarding the target steering angle from the parking assist ECU 12, causes the electric motor to produce a torque for the parking assist control.

The parking assist ECU 12 has a built-in memory 20. The memory 20 stores information regarding a target parking position set by a driver through the setting operation, and information regarding the calculation-generated path to the target parking position. Normally, the information stored in the memory 20 is erased when the parking assist control is completed, for example, when the shift position is changed from the reverse position to the parking position, the neutral position, etc., or when the vehicle has come close to the target parking position.

Operation of the parking assist apparatus 10 of this embodiment will be described below.

Figure 2A:
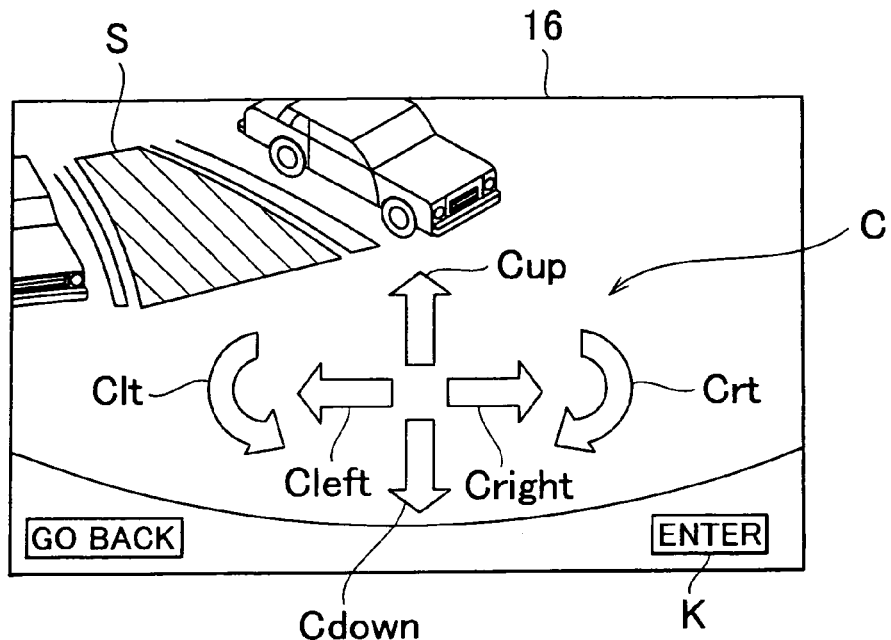
FIG. 2A is a diagram showing an image displayed in the screen of a touch display when a target parking position for garage parking is to be set in the parking assist apparatus of the embodiment.
Figure 2B:
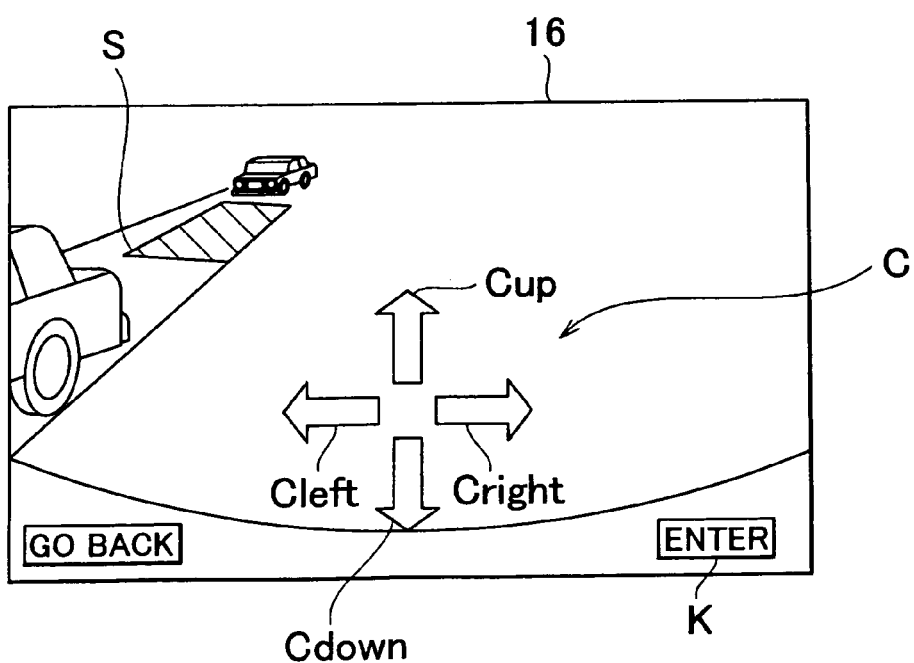
FIG. 2B is a diagram showing an image displayed in the screen of the touch display when a target parking position for parallel parking is to be set in the parking assist apparatus of the embodiment.

FIG. 2A shows an image displayed in the screen of the touch display 16 when a target parking position in garage parking is to be set in the parking assist apparatus 10 of the embodiment. FIG. 2B shows an image displayed in the screen of the touch display 16 when a target parking position in parallel parking is to be set in the parking assist apparatus 10 of the embodiment.

In this embodiment, when the shift position is changed to the reverse position, the screen of the touch display 16 displays the ambient situations behind the vehicle pictured by the back camera 14. The display screen also displays, in a superimposed fashion, the switch for starting the garage parking mode and the switch for starting the parallel parking mode as parking assist control.

If the garage parking mode switch is touched in this situation, the screen of the touch display 16 shows a frame (parking space frame S) indicating a target parking position where the vehicle is intended to be angular-parked on a road surface as shown in FIG. 2A, and arrow button switches C for moving and rotating the parking space frame S, in the superimposed fashion, while the surroundings behind the vehicle pictured by the back camera 14 are displayed.

The arrow button switches C displayed in this case are an upward switch C-up for moving the parking space frame S away from the vehicle (in a rearward direction), a downward switch C-down for moving the parking space frame S closer to the vehicle (in a forward direction), a leftward switch C-left for moving the frame S leftward, a rightward switch C-right for moving the frame S rightward, a counterclockwise switch C-lt for rotating the frame S counterclockwise, and a clockwise switch C-rt for rotating the frame S clockwise. Due to this arrangement, the parking space frame S can be moved in all directions and can be rotated about its center in the screen of the touch display 16.

If the parallel parking mode switch in the screen of the touch display 16 is touched, the screen of the touch display 16, while showing the surroundings behind the vehicle pictured by the back camera 14, superimposes a parking space frame S indicating a target parking position where the vehicle is intended to be parallel-parked on a road surface as shown in FIG. 2B, and arrow button switches C for moving the parking space frame S.

The arrow button switches C displayed in this case are the upward switch C-up, the downward switch C-down, the leftward switch C-left and the rightward switch C-right. That is, the counterclockwise switch C-lt and the clockwise switch C-rt do not appear. Due to this arrangement, the parking space frame S can be moved in all directions relative to the vehicle in the screen of the touch display 16. In this case, the parking space frame S is not rotated about its center, but is merely moved in the longitudinal directions and in the transverse directions relative to the vehicle. The display of the counterclockwise switch C-lt and the clockwise switch C-rt is omitted in the parallel parking mode because the initial position of the vehicle and the target parking position are parallel to each other and therefore it is unnecessary to rotate the parking space frame S. In the following description of the embodiment, although the terms "upward switch C-up", "downward switch C-down", "leftward switch C-left", "rightward switch C-right" and "arrow button switch C" will be collectively used where it is unnecessary to discriminate these switches from the counterclockwise switch C-lt and the clockwise switch C-rt.

The parking space frame S has a rectangular shape with a size substantially equal to the dimensions of the vehicle body on an actual road surface whereas on the display screen the parking space frame S is formed so as to have a shape corresponding to the position thereof relative to the vehicle. If an arrow button switch C is operated by touching, the parking space frame S is moved by X cm (e.g., 5 cm) or rotated by Y° (e.g., 1°) on an actual road surface for every touch. If the parking space frame S is closer to the vehicle, the amount of movement of the parking space frame S in the display screen of the touch display 16 becomes greater due to the perspective appearance of the image of rearward surroundings of the vehicle taken by the back camera 14.

At every predetermined time (e.g., 2 ms) after the parking space frame S and the arrow button switches C are shown in the screen of the touch display 16, the present position of the vehicle is set as an initial position, and calculation is performed to determine a path from the initial position to a target parking position determined in accordance with the operated position of the parking space frame S.

When the garage parking mode switch or the parallel parking mode switch is touched, an enter button switch K for entering the setting of a target parking position using the parking space frame S is superimposed in the display screen together with the parking space frame S and the arrow button switches C. If the enter button switch K is touched after a path to the target parking position has been generated by calculation, the setting of a target parking position is determined. After that, the execution of automatic steering based on the parking assist control is allowed.

Figure 3:
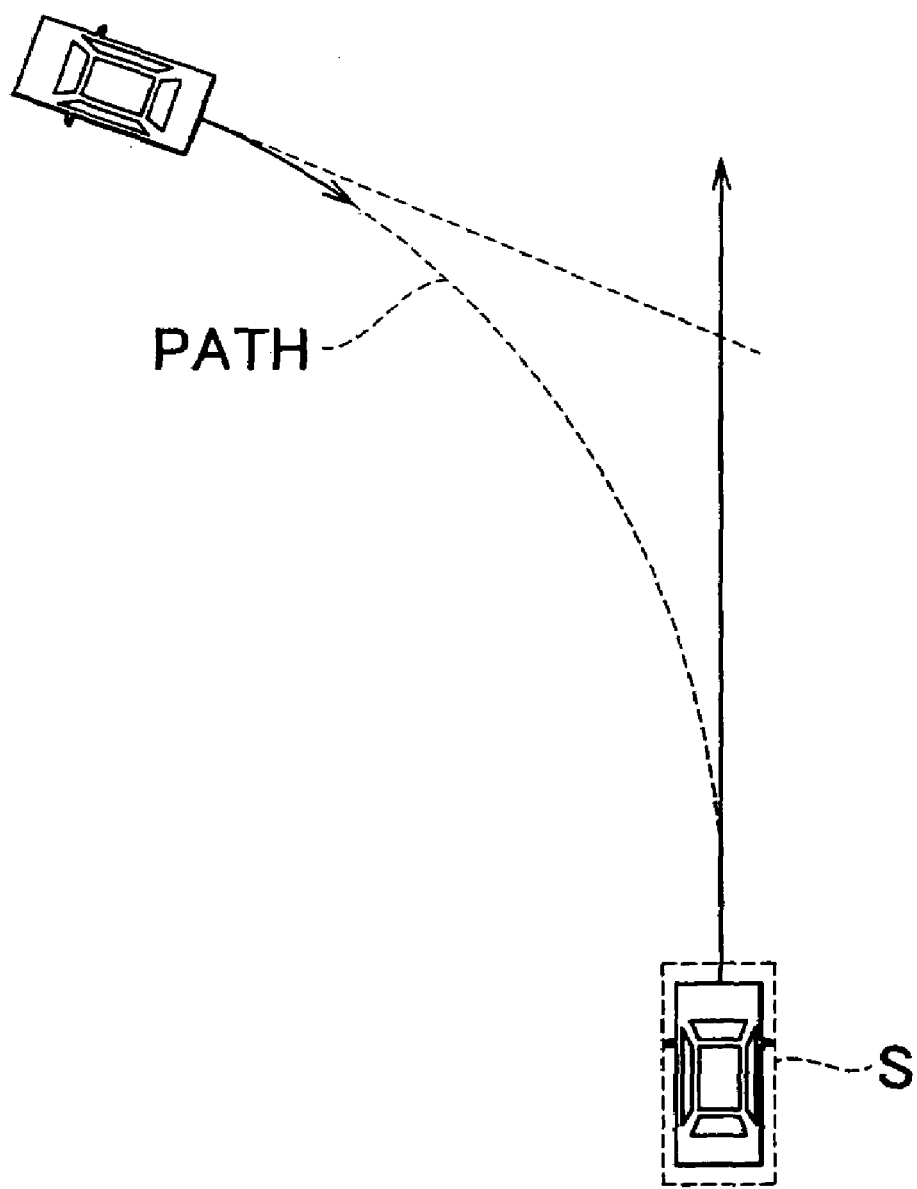
FIG. 3 is a diagram illustrating a path to a target parking position at the time of garage parking.

FIG. 3 illustrates a path to a target parking position at the time of garage parking. During the garage parking mode, the calculation of a path to a target parking position is executed on the basis of a positional relationship between the present position of the vehicle and the target parking position so as to appropriately form, as sections of the path, (1) a straight backing section of a predetermined distance Z1 (not shown), (2) an increasing steering angle section, (3) a fixed steering angle section, (4) a decreasing steering angle section, and (5) a straight backing section of a predetermined distance Z2 (not shown), if a predetermined geometric positional condition determined from the aforementioned positional relationship and the minimum turning radius of the vehicle is met.

Figure 4:
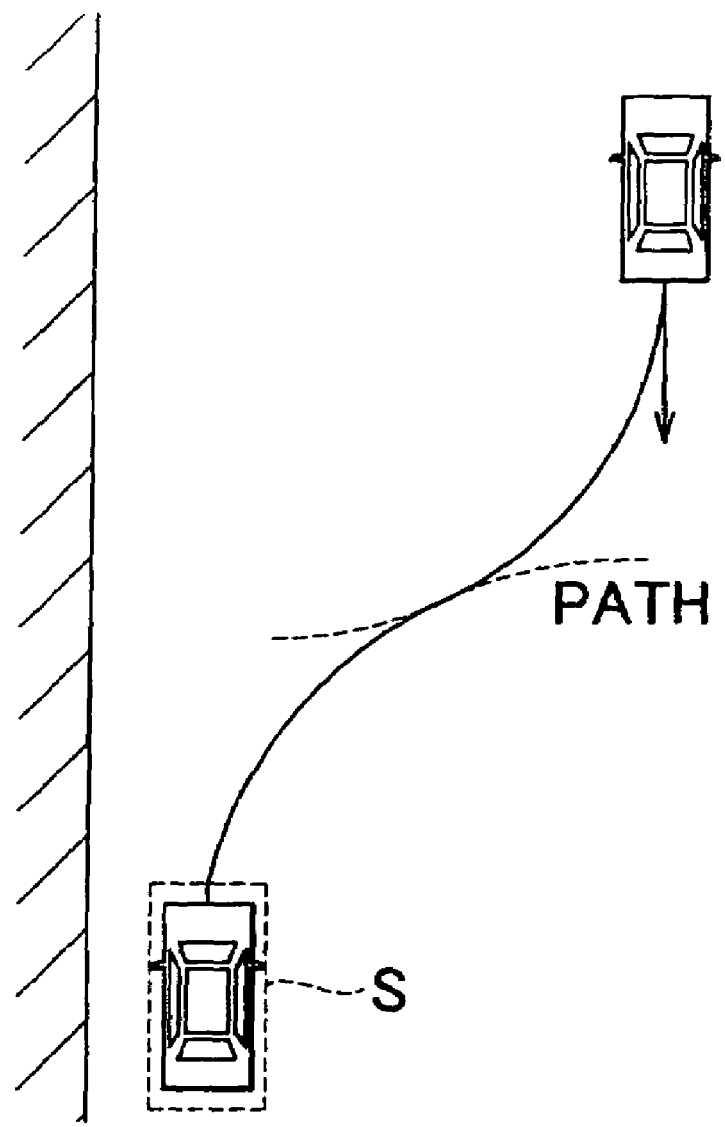
FIG. 4 is a diagram illustrating a path to a target parking position at the time of parallel parking.

FIG. 4 illustrates a path to a target parking position at the time of parallel parking. During the parallel parking mode, the calculation of a path to the target parking position is executed on the basis of a positional relationship between the present position of the vehicle and the target parking position so as to appropriately form a path defined by two touching circles, if a predetermined geometric positional condition determined from the aforementioned positional relationship and the minimum turning radius of the vehicle is met.

If a path to the target parking position during the garage parking mode or the parallel parking mode is calculated and generated, the internal area of the parking space frame S in the screen of the touch display 16 is colored, for example, in green or the like, so as to indicate that the parking assist control can be executed. If the enter button switch K on the touch display 16 is touch-operated after the path to the target parking position has been generated by calculation and the area in the parking space frame S has been colored in green, the arrow button switches C and the enter button switch K become non-display (invisible) on the touch display 16, and the information regarding the path and the information regarding the target parking position are stored into the memory 20.

Conversely, if a path to the target parking position is not generated due to the positional relationship between the vehicle and the target parking position or the like, the internal area of the parking space frame S is colored, for example, in red or the like, so as to indicate that the parking assist control cannot be executed. The display of the arrow button switches C and the enter button switch K is continued so as to prompt the driver to change the target parking position.

If the vehicle begins to move backward due to creeping or the like upon the driver's discontinuation of brake operation after the path to the target parking position has been generated, the amount of movement of the vehicle is calculated from then on. On the basis of the calculated amount of movement and the steering angle information from the EPS 18, the position of the vehicle relative to the generated path is calculated, and a target steering angle for moving the vehicle along the generated path is computed. An instruction regarding the computed target steering angle is supplied to the EPS 18. On the basis of the instruction regarding the target steering angle from the parking assist ECU 12, the EPS 18 causes the electric motor to produce a torque for rotating the steering shaft so that the vehicle will move along the generated path.

After the path to the target parking position is generated and the vehicle begins backing, the amount of movement of the vehicle is calculated, and a reset button switch is displayed in the screen of the touch display 16. The reset button switch is provided for allowing the target parking position of the vehicle to be changed from the presently set position to a different position, that is, allowing the target parking position to be reset. It is desirable that the reset button switch effectively function only while the vehicle is in a stopped state.

If the reset button switch is not touch-operated, the parking assist control is executed in accordance with the path information and the target parking position information presently stored in the memory 20. Conversely, if the reset button switch is touch-operated, the screen of the touch display 16 again displays, in a superimposed fashion, the arrow button switches C, the non-colored parking space frame S and the enter button switch K as shown in FIGS. 2A and 2B. If such a state is brought about, a path from the present position of the vehicle set as an initial position to a target parking position corresponding to the operated position of the parking space frame S is calculated at every predetermined time.

The calculation of a path to a target parking position at the time of resetting is executed on the basis of the steering angle at the time of resetting and the positional relationship between the present position and the target parking position if a condition different from the condition adopted for the calculation of a path at the time of initial setting is met. Similar to the above-described operation at the time of initial setting, an operation is performed in accordance with the presence/absence of a generated path. The above-described resetting operation is performed every time the reset button switch B (not shown) is touched.

According to the above-described construction, it is possible to execute the parking assist control of automatically steering the vehicle along a path to a target parking position set through an operation performed by a vehicle driver at the time of garage parking or parallel parking. If the above-described parking assist control is executed, it is not necessary for the driver to perform a steering operation in order to park the vehicle in the target parking position. Therefore, the parking assist apparatus 10 of this embodiment reduces the driver's burden of steering at the time of garage parking and the time of the parallel parking.

However, in some cases, a path is not generated although calculation of a path to a target parking position is performed during the garage parking mode or the parallel parking mode. In such cases, the internal area of the parking space frame S in the screen of the touch display 16 is colored, for example, in red or the like, and the display of the arrow button switches C and the enter button switch K is continued, so as to prompt the vehicle driver to change or reset the target parking position.

However, if in such an event, the touch display 16 displays all the arrow button switches C, that is, the upward switch C-up, the downward switch C-down, the leftward switch C-left, the rightward switch C-right, the counterclockwise switch C-lt, and the clockwise switch C-rt during the garage parking mode, and the upward switch C-up, the downward switch C-down, the leftward switch C-left, and the rightward switch C-right during the parallel parking mode, an operation of changing the orientation of the parking space frame S relative to the vehicle and an operation of moving the parking space frame S in such a direction that a path is not generated (i.e., in such a direction that the vehicle cannot be parked) are allowed to be performed by using the arrow button switches C. As a result, it becomes difficult for the vehicle driver to instantly or intuitively understand how to operate the parking space frame S via arrow button switches C in order to set a target parking position that assures generation of a path thereto.

Therefore, if a path to a target parking position in accordance with a positioning operation of the parking space frame S is not generated, the parking assist apparatus 10 of this embodiment does not aid in the operations of changing the orientation of the parking space frame S relative to the vehicle or moving the parking space frame S in such directions that parking is impossible, but aids only in the frame moving operations and the like that will enable the parking, and thus indicates to the vehicle driver how to operate the parking space frame S in order to reset a target parking position that assures generation of a path thereto. Therefore, it becomes possible for the vehicle driver to easily accomplish the operation of resetting a target parking position.

Figure 5A:
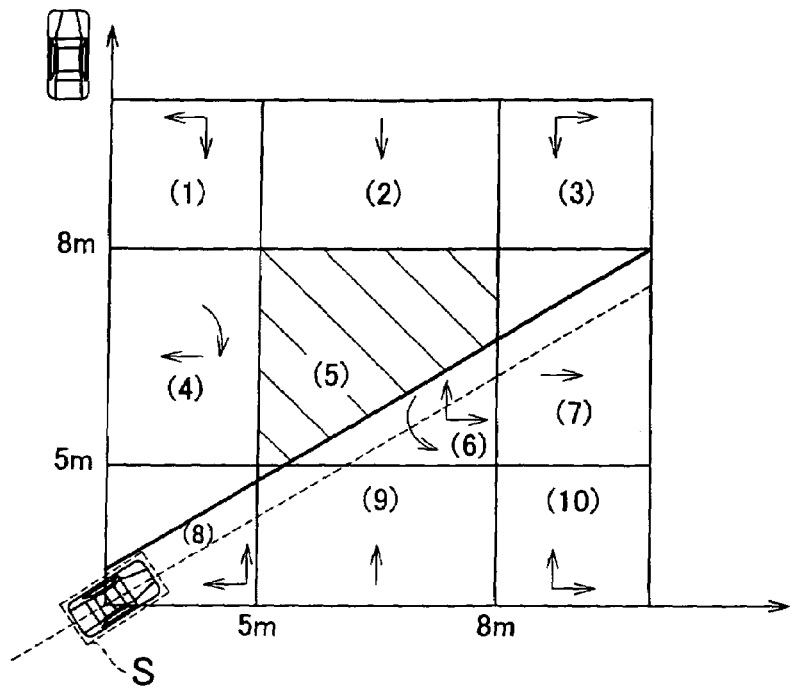
FIGS. 5A and 5B are diagrams that schematically illustrate positional relationships between the vehicle and a parking space frame and relative angles between the facing direction of the vehicle and the orientation of the parking space frame for the purpose of discriminating the operating switches to be displayed and the operating switches not to be displayed in the display screen if a path is not generated during an garage parking mode of the parking assist apparatus of this embodiment when the vehicle is to be angular-parked diagonally left rearward.
Figure 5B:
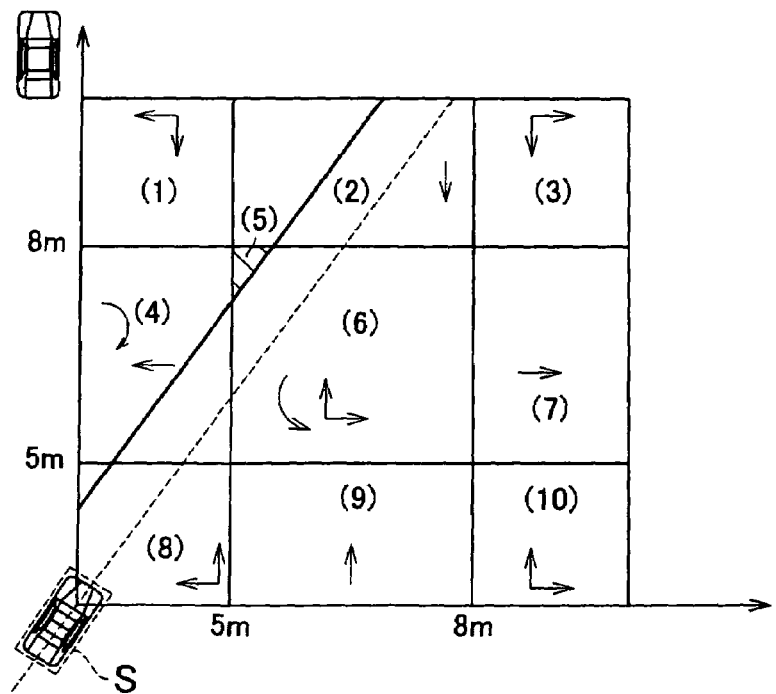
Figure 6A:
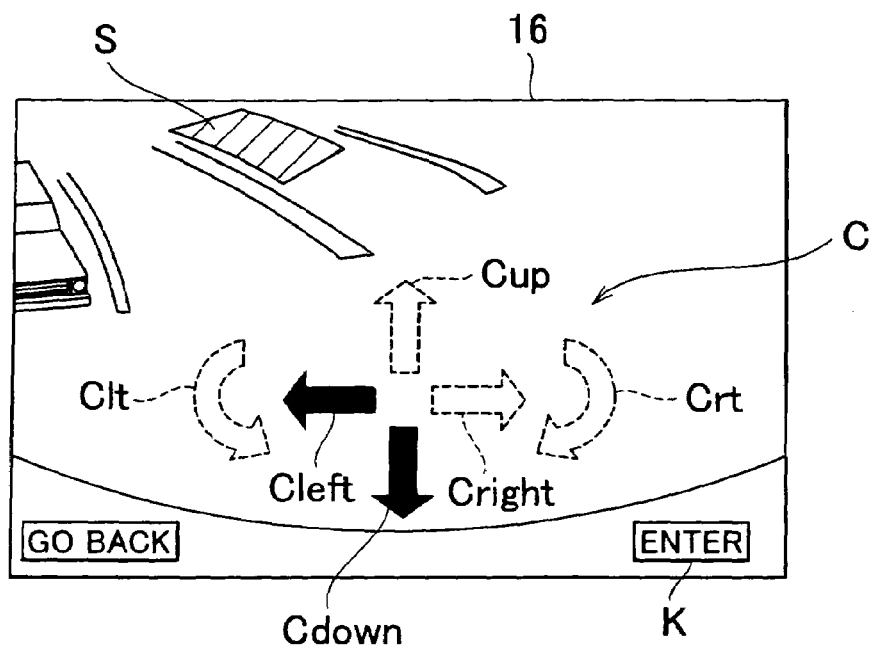
FIGS. 6A and 6B are diagrams illustrating examples of the display of operating switches in the display screen if a path is not generated during an garage parking mode of the parking assist apparatus of this embodiment when the vehicle is to be angular-parked diagonally left rearward.
Figure 6B:
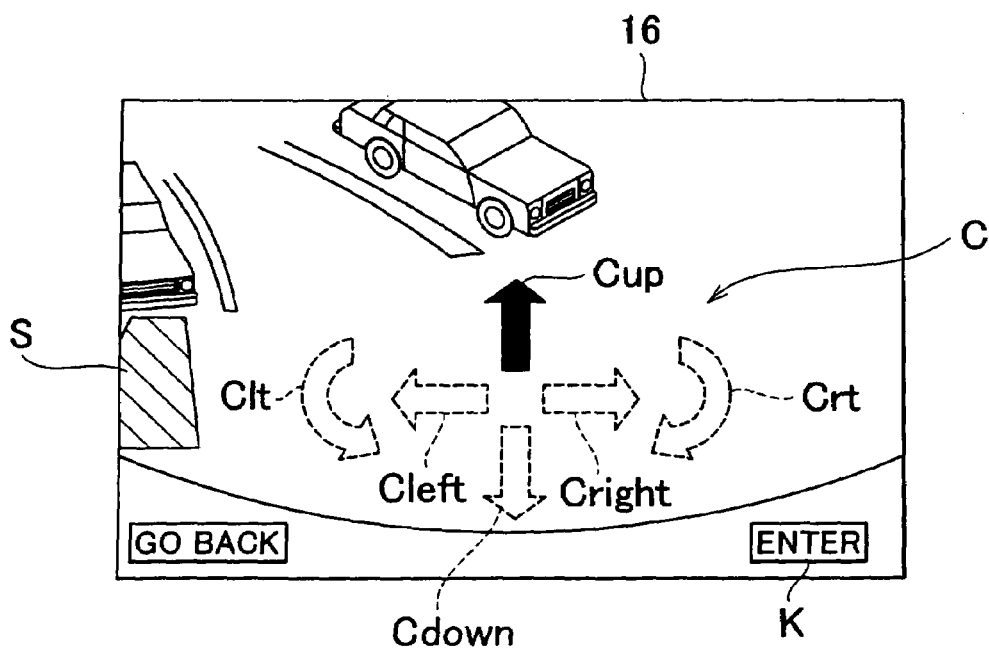

FIGS. 5A and 5B show diagrams that schematically illustrate positional relationships between the vehicle and the parking space frame S and relative angles between the facing direction of the vehicle and the orientation of the parking space frame S for the purpose of discriminating the arrow button switches C to be displayed and the arrow button switches C not to be displayed on the touch display 16 if a path is not generated during the garage parking mode of the parking assist apparatus 10 of this embodiment when the vehicle is to be moved diagonally left rearward for garage parking. FIGS. 6A and 6B are diagrams illustrating examples of the display of arrow button switches C on the touch display 16 if a path is not generated during the garage parking mode of the parking assist apparatus 10 of this embodiment when the vehicle is to be moved diagonally left rearward for garage parking. In the two cases shown in FIGS. 5A and 5B, the relative angles between the facing direction of the vehicle and the orientation of the parking space frame S are different from each other while the facing direction of the vehicle is fixed to an upward direction in the screen.

In this embodiment, the memory 20 of the parking assist ECU 12 stores information for restricting the movements of the parking space frame S for the sake of the operation of resetting a target parking position such that a path can be generated in the case where a previously set target parking position does not allow generation of a path. This information includes information for discriminating the arrow button switches C to be displayed and the arrow button switches C not be displayed on the touch display 16, information regarding characters and voices for visual and auditory notifications to a vehicle driver, etc. For example, in cases where the vehicle is moved diagonally left rearward for garage parking, the aforementioned information includes different pieces of information corresponding to ten regions divided as indicated in FIGS. 5A and 5B on the basis of the positional relationships between the vehicle and the parking space frame S and the angular relationships between the facing direction of the vehicle and the orientation of the parking space frame S. The memory 20 also stores information provided for the operation of garage parking the vehicle diagonally right rearward.

Specifically, in conjunction with diagonally left-rearward garage parking, a region (1) is defined in which the distance of the parking space frame S from the vehicle in the vehicular longitudinal direction (distance in the vertical axis direction in FIGS. 5A and 5B) is long, for example, greater than 8 meters, and the distance thereof in the vehicular transverse direction (distance in the horizontal axis direction in FIGS. 5A and 5B) is short, for example, less than 5 meters, at the time point when a path is not generated. Corresponding to the region (1), the information that the downward switch C-down and the leftward switch C-left are the arrow button switches C to be displayed and the other switches C are the arrow button switches C not to be displayed is stored in order to promote the movement of the target parking position closer to the vehicle in the vehicular longitudinal direction and the movement thereof closer to the vehicle in the vehicular transverse direction and restrict the movements thereof in the other directions.

Corresponding to a region (2) where the longitudinal distance from the vehicle to the parking space frame S is relatively long and the transverse distance to the parking space frame S is appropriately intermediate, the information that the downward switch C-down is to be displayed and the other arrow button switches C are not to be displayed is stored in order to promote the movement of the target parking position closer to the vehicle in the vehicular longitudinal direction and restrict the movements thereof in the other directions.

Corresponding to a region (3) where the longitudinal distance from the vehicle to the parking space frame S is long and the transverse distance to the parking space frame S is long, for example, longer than 8 meters, the information that the downward switch C-down and the rightward switch C-right are to be displayed and the other arrow button switches C are not to be displayed is stored in order to promote the movements of the target parking position closer to the vehicle in the vehicular longitudinal direction and closer to the vehicle in the vehicular transverse direction and restrict the movements thereof in the other directions.

Corresponding to a region (4) where the longitudinal distance from the vehicle to the parking space frame S is appropriately intermediate and the transverse distance to the parking space frame S is short, the information that the leftward switch C-left and the clockwise switch C-rt are to be displayed and the other arrow button switches C are not to be displayed is stored in order to promote the movement of the target parking position away from the vehicle in the transverse direction and the clockwise rotation thereof and restrict the movements thereof in the other directions.

Corresponding to a region (5) (an upper region indicated by hatching in FIG. 5A and partially defined by a line (solid line) parallel to a center line (broken line) of the parking space frame S and apart from the center line by a predetermined distance) where the longitudinal distance and the transverse distance from the vehicle to the parking space frame S are appropriately intermediate and the relative angle between the parking space frame S and the vehicle is such an angle that the vehicle can be moved and turned diagonally left rearward into the parking space frame S in a continuous motion without back and forth movements, the information that all the arrow button switches C are to be displayed is stored since there is no need to restrict the movements of the target parking position when the vehicle is in this region.

Corresponding to a region (6) (a lower region partially defined by a line (solid line) parallel to a center line (broken line) of the parking space frame S and apart from the center line by a predetermined distance in each of FIGS. 5A and 5B) where the longitudinal distance and the transverse distance from the vehicle to the parking space frame S are appropriately intermediate but the relative angle between the parking space frame S and the vehicle is not such an angle that the vehicle can be turned and moved diagonally left rearward into the parking space frame S in a continuous motion without back and forth movements, the information that the upward switch C-up, the rightward switch C-right and the counterclockwise switch C-lt are to be displayed and the other arrow button switches C are not be displayed is stored in order to promote the movements of the target parking position away from the vehicle in the vehicular longitudinal direction and closer to the vehicle in the vehicular transverse direction and the counterclockwise rotation thereof and restrict the movements of the target parking position in the other directions.

Corresponding to a region (7) where the longitudinal distance from the vehicle to the parking space frame S is appropriately intermediate and the transverse distance to the parking space frame S is long, the information that the rightward switch C-right is to be displayed and the other arrow button switches C are not to be displayed is stored in order to promote the movement of the target parking position closer to the vehicle in the vehicular transverse direction and restrict the movements thereof in the other directions.

Corresponding to a region (8) where the longitudinal distance from the vehicle to the parking space frame S is short, for example, less than 5 meters, and the transverse distance to the parking space frame S is short, the information that the upward switch C-up and the leftward switch C-left are to be displayed and the other arrow button switches C are not to be displayed is stored in order to promote the movements of the target parking position away from the vehicle in the longitudinal direction and the transverse direction and restrict the movements thereof in the other directions.

Corresponding to a region (9) where the longitudinal distance from the vehicle to the parking space frame S is short and the transverse distance to the parking space frame S is appropriately intermediate, the information that the upward switch C-up is to be displayed and the other arrow button switches C are not to be displayed is stored in order to promote the movement of the target parking position away from the vehicle in the longitudinal direction and restrict the movements thereof in the other directions.

Corresponding to a region (10) where the longitudinal distance from the vehicle to the parking space frame S is short and the transverse distance to the parking space frame S is long, the information that the upward switch C-up and the rightward switch C-right are to be displayed and the other arrow button switches C are not to be displayed is stored in order to promote the movements of the target parking position away from the vehicle in the vehicular longitudinal direction and closer to the vehicle in the vehicular transverse direction and restrict the movements thereof in the other directions.

In the cases where the vehicle is moved diagonally right rearward for garage parking, the relationship between the arrow button switches C to be displayed and the arrow button switches C to be not displayed on the touch display 16 is inverted in terms of right and left from the above-described relationship in conjunction with the diagonally left-rearward garage parking.

In the parking assist apparatus 10 of this embodiment, if a path is not generated as a result of calculation of a path to a target parking position set in accordance with the position of the parking space frame S in the touch display 16 during the garage parking mode, the positional relationship between the target parking position and the vehicle and the relative angle of the facing direction of the vehicle and the orientation of the parking space frame S are computed. On the basis of the computed positional relationship and the computed relative angle, it is determined which one of the regions indicated in FIGS. 5A and 5B the vehicle belongs to in relation to the target parking position.

After the region in which the vehicle exists in relation to the target parking position is determined, the information for discriminating the arrow button switches C to be displayed and the arrow button switches C not to be displayed on the touch display 16 corresponding to the determined region is retrieved from the memory 20. Then, the arrow button switches C to be displayed are displayed on the touch display 16 whereas the arrow button switches C not to be displayed become non-displayed on the touch display 16 or are displayed dimmer than the displayed arrow button switches C, and are made nonfunctional or irresponsive to touching.

For example, if at the time of diagonally left-rearward garage parking, the vehicle is in the region (1) indicated in FIGS. 5A and 5B in relation to the target parking position, and is angled as indicated in FIG. 5A in relation to the target parking position (parking space frame S), the downward switch C-down and the leftward switch C-left are displayed in the screen of the touch display 16 while the upward switch C-up, the rightward switch C-right, the clockwise switch C-rt and the counterclockwise switch C-lt become non-displayed, or are displayed dimmer than the downward switch C-down and the leftward switch C-left, as shown in FIG. 6A.

Furthermore, if at the time of diagonally left-rearward garage parking, the vehicle is in the region (9) indicated in FIGS. 5A and 5B in relation to the target parking position, and is angled as indicated in FIG. 5A in relation to the target parking position (parking space frame S), the upward switch C-up is displayed in the screen of the touch display 16 while the leftward switch C-left, the rightward switch C-right, the downward switch C-down, the counterclockwise switch C-lt and the clockwise switch C-rt become non-displayed, or are displayed dimmer than the upward switch C-up, as shown in FIG. 6B.

Figure 7:
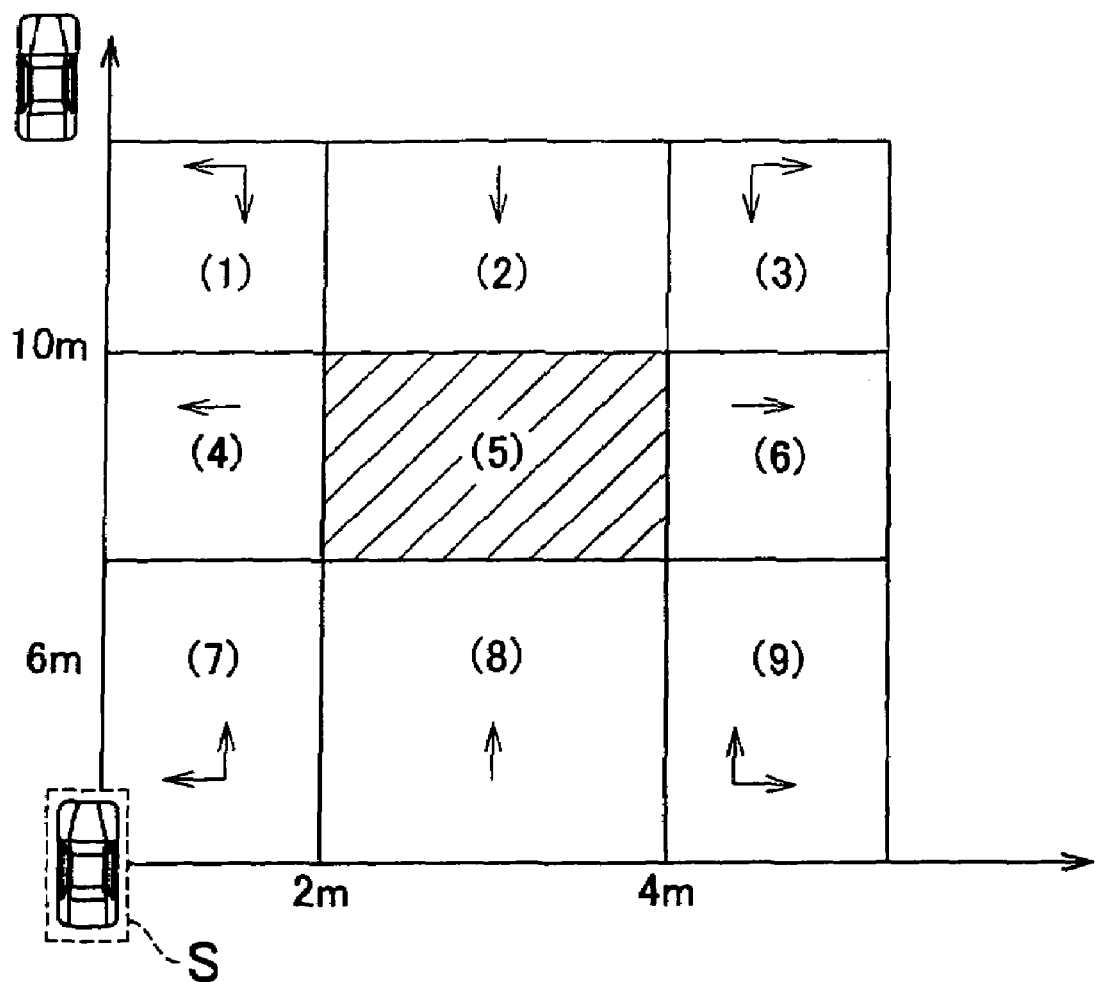
FIG. 7 is a diagram schematically illustrating positional relationships between the vehicle and the parking space frame for the purpose of discriminating the operating switches to be displayed and the operating switches not to be displayed in the display screen if a path is not generated during a parallel parking mode of the parking assist apparatus of this embodiment when the vehicle is to be parallel-parked diagonally left rearward.
Figure 8A:
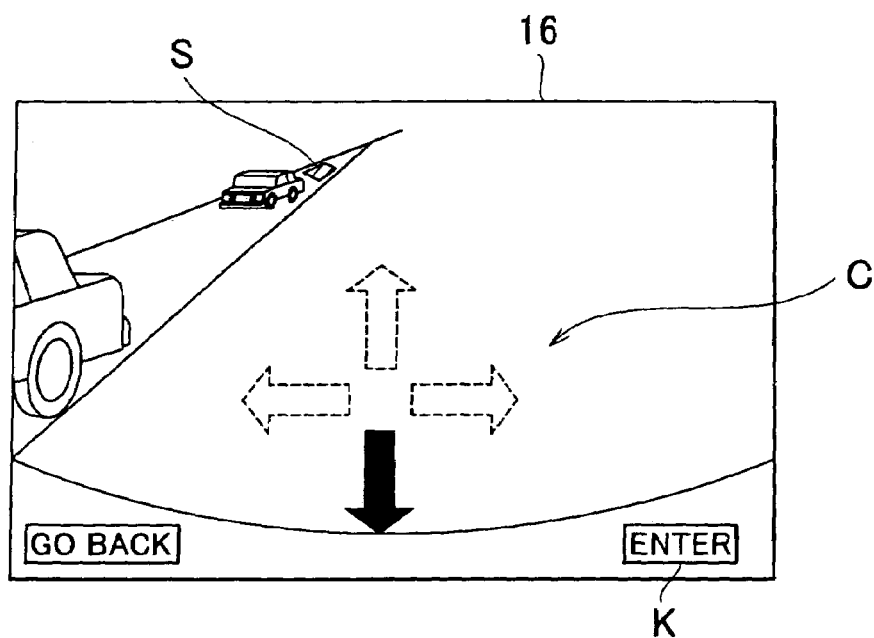
FIGS. 8A and 8B are diagrams illustrating examples of the display of operating switches in the display screen if a path is not generated during the parallel parking mode of the parking assist apparatus of this embodiment when the vehicle is to be parallel-parked diagonally left rearward.
Figure 8B:
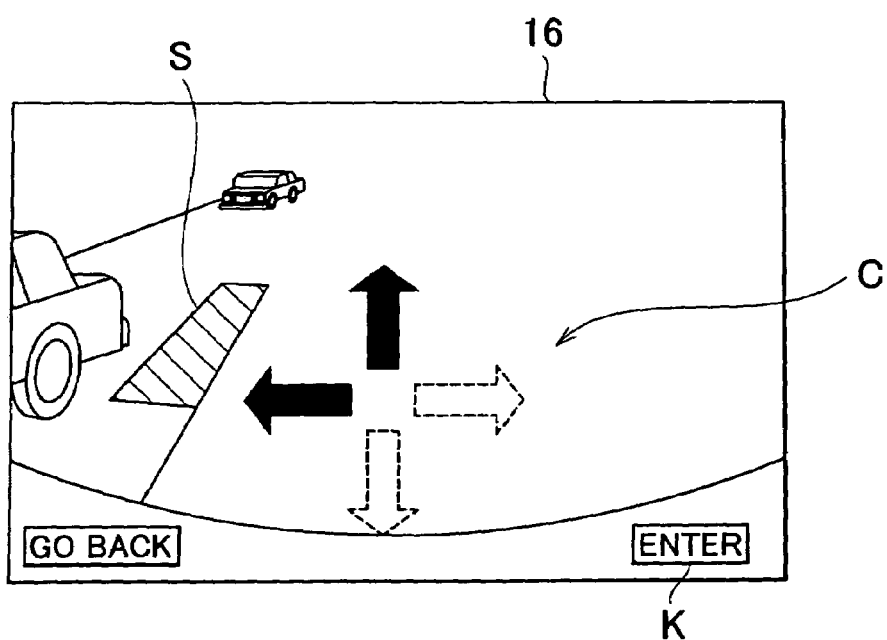

FIG. 7 shows a diagram schematically illustrating positional relationships between the vehicle and the parking space frame S for the purpose of discriminating the arrow button switches C to be displayed and the arrow button switches C not to be displayed on the touch display 16 if a path is not generated during the parallel parking mode of the parking assist apparatus 10 of this embodiment when the vehicle is to be parallel-parked diagonally left rearward. FIGS. 8A and 8B are diagrams illustrating examples of the display of arrow button switches C on the touch display 16 if a path is not generated during the parallel parking mode of the parking assist apparatus 10 of this embodiment when the vehicle is to be moved diagonally left rearward for parallel parking.

In this embodiment, the memory 20 of the parking assist ECU 12 stores information for restricting the movements of the parking space frame S for the sake of the operation of resetting a target parking position such that a path can be generated in the case where a previously set target parking position does not allow generation of a path thereto. In cases where the vehicle is moved diagonally left rearward for parallel parking, the aforementioned information includes different pieces of information corresponding to nine regions divided on the basis of the positional relationships between the vehicle and the parking space frame S as indicated in FIG. 7. The memory 20 also stores information provided for the operation of parallel-parking the vehicle diagonally right rearward.

Specifically, in conjunction with diagonally left-rearward parallel parking, a region (1) is defined in which the distance of the parking space frame S from the vehicle in the vehicular longitudinal direction (distance in the vertical axis direction in FIG. 7) is long, for example, greater than 10 meters, and the distance thereof in the vehicular transverse direction (distance in the horizontal axis direction in FIG. 7) is short, for example, less than 2 meters, at the time point when a path is not generated. Corresponding to the region (1), the information that the downward switch C-down and the leftward switch C-left are the arrow button switches C to be displayed and the other switches C are the arrow button switches C not to be displayed is stored in order to promote the movement of the target parking position closer to the vehicle in the vehicular longitudinal direction and the movement thereof away from the vehicle in the vehicular transverse direction and restrict the movements thereof in the other directions.

Corresponding to a region (2) where the longitudinal distance from the vehicle to the parking space frame S is relatively long and the transverse distance to the parking space frame S is appropriately intermediate, the information that the downward switch C-down is to be displayed and the other arrow button switches C are not to be displayed is stored in order to promote the movement of the target parking position closer to the vehicle in the vehicular longitudinal direction and restrict the movements thereof in the other directions.

Corresponding to a region (3) where the longitudinal distance from the vehicle to the parking space frame S is long and the transverse distance to the parking space frame S is long, for example, longer than 4 meters, the information that the downward switch C-down and the rightward switch C-right are to be displayed and the other arrow button switches C are not to be displayed is stored in order to promote the movements of the target parking position closer to the vehicle in the vehicular longitudinal direction and closer to the vehicle in the vehicular transverse direction and restrict the movements thereof in the other directions.

Corresponding to a region (4) where the longitudinal distance from the vehicle to the parking space frame S is appropriately intermediate and the transverse distance to the parking space frame S is short, the information that the leftward switch C-left is to be displayed and the other arrow button switches C are not to be displayed is stored in order to promote the movement of the target parking position away from the vehicle in the transverse direction and restrict the movements thereof in the other directions.

Corresponding to a region (5) where the longitudinal distance and the transverse distance from the vehicle to the parking space frame S are appropriately intermediate, the information that all the arrow button switches C are to be displayed is stored since there is no need to restrict the movements of the target parking position when the vehicle is in this region.

Corresponding to a region (6) where the longitudinal distance from the vehicle to the parking space frame S is appropriately intermediate and the transverse distance to the parking space frame S is long, the information that the rightward switch C-right is to be displayed and the other arrow button switches C are not to be displayed is stored in order to promote the movement of the target parking position closer to the vehicle in the vehicular transverse direction and restrict the movements thereof in the other directions.

Corresponding to a region (7) where the longitudinal distance from the vehicle to the parking space frame S is short, for example, less than 6 meters, and the transverse distance to the parking space frame S is short, the information that the upward switch C-up and the leftward switch C-left are to be displayed and the other arrow button switches C are not to be displayed is stored in order to promote the movements of the target parking position away from the vehicle in the longitudinal direction and the transverse direction and restrict the movements thereof in the other directions.

Corresponding to a region (8) where the longitudinal distance from the vehicle to the parking space frame S is short and the transverse distance to the parking space frame S is appropriately intermediate, the information that the upward switch C-up is to be displayed and the other arrow button switches C are not to be displayed is stored in order to promote the movement of the target parking position away from the vehicle in the longitudinal direction and restrict the movements thereof in the other directions.

Corresponding to a region (9) where the longitudinal distance from the vehicle to the parking space frame S is short and the transverse distance to the parking space frame S is long, the information that the upward switch C-up and the rightward switch C-right are to be displayed and the other arrow button switches C are not to be displayed is stored in order to promote the movements of the target parking position away from the vehicle in the vehicular longitudinal direction and closer to the vehicle in the vehicular transverse direction and restrict the movements thereof in the other directions.

In the cases where the vehicle is moved diagonally right rearward for parallel parking, the relationship between the arrow button switches C to be displayed and the arrow button switches C to be not displayed on the touch display 16 is inverted in terms of right and left from the above-described relationship in conjunction with the diagonally left-rearward parallel parking.

In the parking assist apparatus 10 of this embodiment, if a path is not generated as a result of calculation of a path to a target parking position set in accordance with the position of the parking space frame S in the touch display 16 during the parallel parking mode, the positional relationship between the target parking position and the vehicle is computed. On the basis of the computed positional relationship, it is determined which one of the regions indicated in FIG. 7 the vehicle belongs to in relation to the target parking position.

After the region in which the vehicle exists in relation to the target parking position is determined, the information for discriminating the arrow button switches C to be displayed and the arrow button switches C not to be displayed on the touch display 16 corresponding to the determined region is retrieved from the memory 20. Then, the arrow button switches C to be displayed are displayed on the touch display 16 whereas the arrow button switches C not to be displayed become non-displayed on the touch display 16 or are displayed dimmer than the displayed arrow button switches C, and are made nonfunctional or irresponsive to touching.

For example, if at the time of diagonally left-rearward parallel parking, the vehicle is in the region (2) indicated in FIG. 7 in relation to the target parking position, the downward switch C-down is displayed in the screen of the touch display 16 while the upward switch C-up, the leftward switch C-left and the rightward switch C-right become non-displayed, or are displayed dimmer than the downward switch C-down, as shown in FIG. 8A.

Furthermore, if at the time of diagonally left-rearward parallel parking, the vehicle is in the region (7) indicated in FIG. 7 in relation to the target parking position, the upward switch C-up and the leftward switch C-left are displayed in the screen of the touch display 16 while the downward switch C-down and the rightward switch C-right become non-displayed, or are displayed dimmer than the upward switch C-up and the leftward switch C-left, as shown in FIG. 8B.

Thus, if a path to a target parking position set in accordance with the positioning operation of the parking space frame S is not generated during the garage parking mode or the parallel parking mode, the parking assist apparatus 10 of this embodiment displays, in the screen of the touch display 16, the arrow button switches C that prohibit movements of the parking space frame S and the arrow button switches C that allow movements of the parking space frame S in a distinguishable fashion.

The arrow button switches C that prohibit movements of the parking space frame S are switches for changing the angle of the parking space frame S to the vehicle or moving the parking space frame S in such directions that a path is not generated (i.e., the parking of the vehicle is impossible). Therefore, if the arrow button switches C that prohibit movements of the parking space frame S and the arrow button switches C that allow movements of the parking space frame S are displayed in a distinguishable fashion on the touch display 16, it becomes easier for a vehicle driver to visually understand the direction to move or rotate the parking space frame S in order to set a target parking position in which the vehicle can be parked, and therefore the driver is prompted to perform a touch operation for that direction.

Furthermore, in the parking assist apparatus 10 of this embodiment, if a path to a target parking position set in accordance with the positioning operation of the parking space frame S is not generated during the garage parking mode or the parallel parking mode, one or more of the arrow button switches C become unfunctional or irresponsive to touching, so that the movement/rotations of the parking space frame S corresponding to those arrow button switches C cannot be carried out, that is, are suppressed. In this case, the vehicle driver is allowed to touch-operate only the arrow button switches C provided for moving or rotating the parking space frame S so as to set a target parking position in which the vehicle can be parked.

Therefore, according to the parking assist apparatus 10 of this embodiment, when a target parking position is to be reset after the parking in the present target parking position set in accordance with the positioning operation of the parking space frame S is found to be difficult as a path to the target parking position is not generated, it is possible to make it easy for a vehicle driver to accomplish the touch operation of the arrow button switches C for moving or rotating the parking space frame S on the touch display 16 in such a direction that parking becomes possible.

Figure 9:
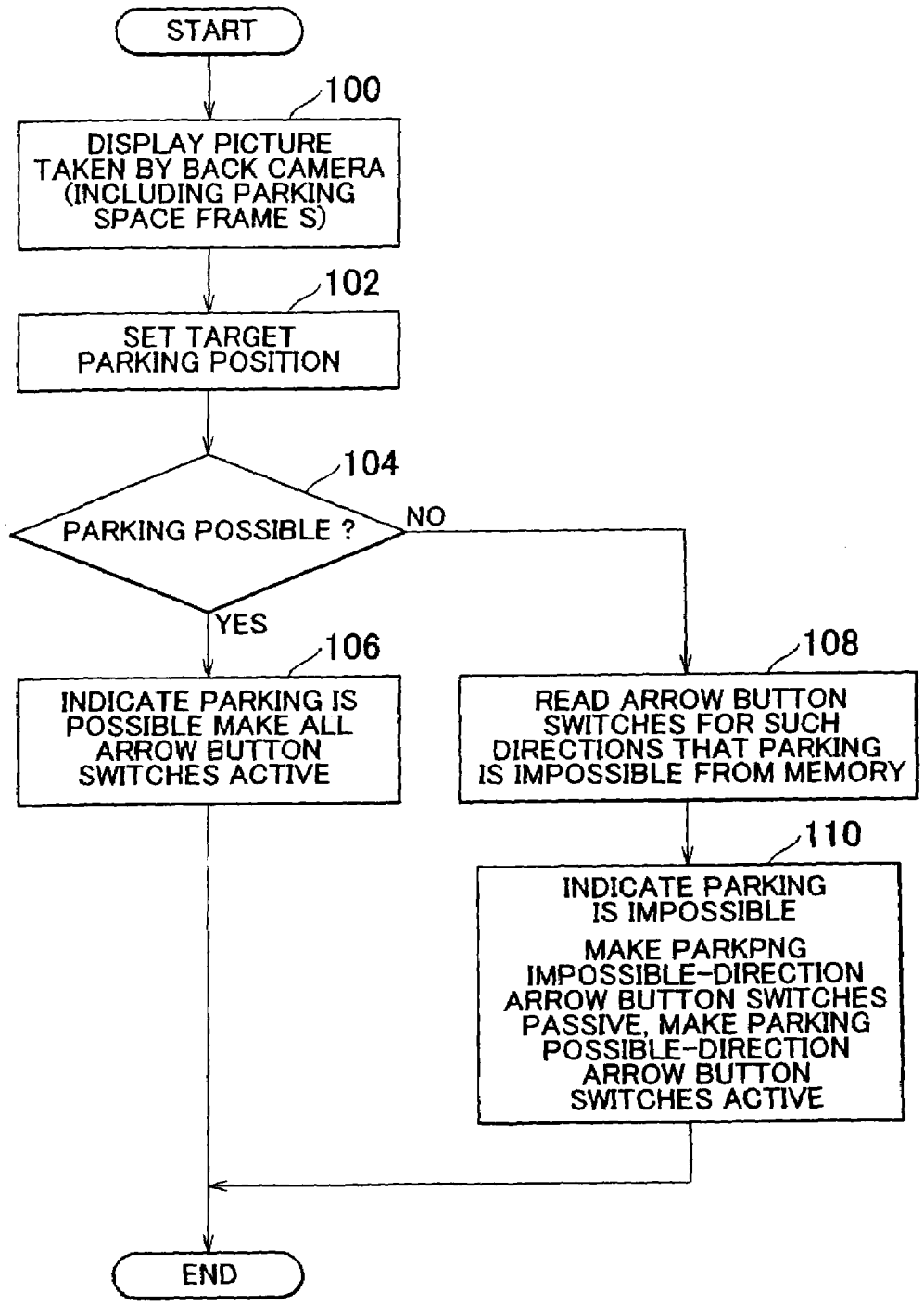
FIG. 9 is a flowchart illustrating a control routine executed to control the display of operating switches in the display screen of the parking assist apparatus of the embodiment.

FIG. 9 is a flowchart illustrating a control routine executed by the parking assist ECU 12 in the embodiment during the garage parking mode and during the parallel parking mode. The routine illustrated in FIG. 9 is activated every time the shift position is changed to the reverse position. When the routine illustrated in FIG. 9 is started, the process of step 100 is first executed.

In step 100, a process of displaying a picture taken by the back camera 14 in the screen of the touch display 16 and displaying the arrow button switches C that are touch-operated by a driver and the parking space frame S that is shifted in position by the touch operation of the switches in a superimposed fashion is executed.

In step 102, a process of setting a target parking position to park the vehicle in accordance with the operated position of the parking space frame S in the screen of the touch display 16 is executed. After the process of step 102 is executed, calculation of a path to the set target parking position will be performed on the basis of the geometric positional relationship between the position of the vehicle and the target parking position and, if necessary, the relative angle of the vehicle to the target parking position.

Subsequently in step 104, it is determined whether the vehicle can be parked in the target parking position on the basis of whether a path has been generated as a result of the calculation of a path to the target parking position in step 102. If it is determined in step 104 that the parking is possible since a path to the target parking position has been generated, step 106 is executed. Conversely, if it is determined in step 104 that the parking in the target parking position is difficult or impossible since a path to the target parking position has not been generated despite the calculation thereof, step 108 is subsequently executed.

In step 106, the internal area of the parking space frame S displayed in the screen of the touch display 16 is colored in green or the like to indicate to a vehicle driver that the vehicle can be parked in the set target parking position. Furthermore in step 106, all the arrow button switches C displayable in the screen of the touch display 16 are made active in order to allow the parking space frame S to be moved in all directions. Executing the process of step 106 makes it possible to move the parking space frame S in every direction in the screen of the touch display 16 and execute the parking assist control via automatic steering in response to the touch operation of the enter button switch K.

In step 108, on the other hand, it is determined which region the vehicle belongs to in relation to the target parking position with reference to maps that express relationships as indicated in FIGS. 5A and 5B and FIG. 7 on the basis of the geometric positional relationship between the position of the vehicle and the target parking position and, if necessary, the relative angle of the vehicle to the target parking position. Corresponding to the determined region, the information for discriminating the arrow button switches C for moving or rotating the parking space frame S in such directions that the parking of the vehicle impossible and the arrow button switches C for moving or rotating the parking space frame S in such directions that the parking is possible is retrieved.

Subsequently in step 110, the internal area of the parking space frame S displayed in the screen of the touch display 16 is colored in red or the like to indicate to the vehicle driver that the vehicle cannot be parked in the set target parking position. Furthermore in step 110, of the arrow button switches C displayable in the screen of the touch display 16, the arrow button switches C for moving or rotating the parking space frame S in such directions that the parking of the vehicle is impossible are made passive, and the other arrow button switches C are made active. Executing the process of step 110 allows the parking space frame S to be moved in the screen of the touch display 16 only in such directions that the parking is possible, and therefore facilitates the resetting of a target parking position. When the process of step 110 ends, the present execution of the routine ends.

According to the routine illustrated in FIG. 9, if a path to a target parking position set in accordance with the positioning operation of the parking space frame S is not generated during the garage parking mode or the parallel parking mode, it is indicated on the touch display 16 that the vehicle cannot be parked, unlike the case where a path is generated. Furthermore, the arrow button switches C for moving or rotating the parking space frame S in such directions that parking is impossible are made non-displayed or are displayed dimmer than the arrow button switches C for moving or rotating the parking space frame S in such directions that parking is possible, the functions of the arrow button switches C for moving or rotating the parking space frame S in such direction that parking is impossible are suppressed.

According to this construction, when a target parking position is to be reset after the parking in the present target parking position is found impossible as a path to the target parking position is not generated, the arrow button switches C that allow movements of the parking space frame S and the arrow button switches C that prohibit movements of the parking space frame S in accordance with the target parking position that has been found not to allow generation of a path thereto are displayed in a distinguishable fashion in the screen of the touch display 16. Therefore, it becomes easy for the vehicle driver to visually understand which direction to move or rotate the parking space frame S in order to set a target parking position in which the vehicle can be parked. Thus, the vehicle driver is prompted to perform the touch operation for that direction, and is aided in the positioning operation of the parking space frame S.

Furthermore, according to the above-described construction, when a target parking position is to be reset after the parking in the presently set target parking position is found impossible as a path to the target parking position is not generated, the functions of the arrow button switches C that prohibit movements of the parking space frame S are disabled, so that the movements or rotations of the parking space frame S via those arrow button switches C are not performed, and are suppressed. Therefore, the vehicle driver is allowed to perform only the touch operations of the arrow button switches C for the directions in which the parking space frame S should be moved or rotated in order to reset a target parking position in which the vehicle can be parked. Thus, the driver is aided in the positioning operation of the parking space frame S.

Therefore, according to the parking assist apparatus 10 of this embodiment, when a target parking position is to be reset after the parking in the target parking position presently set in accordance with the positioning operation of the parking space frame S becomes difficult (including impossible) as a path to the target parking position is not generated, it is possible to make it easy for a vehicle driver to accomplish the touch operation of the arrow button switches C for moving or rotating the parking space frame S on the touch display 16 in such a direction that the parking becomes possible. Therefore, if a path to a target parking position is not generated, the vehicle driver can promptly accomplish the resetting of a target parking position.

In the parking assist apparatus 10 of this embodiment, when the parking in the target parking position presently set in accordance with the positioning operation of the parking space frame S is found difficult as a path to the target parking position is not generated, the arrow button switches C that prohibit movements of the parking space frame S and the arrow button switches C that allow movements of the arrow button switches C are displayed in a distinguishable fashion on the touch display 16. Furthermore, explanations about why the parking is impossible and descriptions of what direction to move or rotate the parking space frame S in order to reset a target parking position are displayed or read out in a voice via a speaker device in response to execution of an operation of resetting a target parking position or depression of a "help" button shown in the screen of the touch display 16.

The memory 20 of the parking assist ECU 12, as described above, stores the information for restricting movements of the parking space frame S for the sake of the resetting of a target parking position that allows generation of a path thereto if a path to the presently set target parking position is not generated. This information includes character and voice information for visual and auditory notifications to a vehicle driver, etc.

Examples of the character and voice information for the garage parking in the diagonally left rearward direction include: a statement "The target parking position is too far. Please move it closer to your vehicle." for the regions (1), (2) and (3) indicated in FIGS. 5A and 5B; a statement a statement "The target parking position is too far in the transverse direction. Please move it closer to your vehicle." for the region (7); a statement "The target parking position is too close. Please set it away from your vehicle." for the regions (8), (9) and (10); a statement "The target parking position is angled too sharp to your vehicle. Please turn it clockwise." for the region (4); and a statement "The target parking position is too parallel to your vehicle. Please turn it counterclockwise." for the region (6).

For the parallel parking in the diagonally left-rearward direction, examples of the character and voice information include: a statement "The target parking position is too far. Please move it closer to your vehicle." for the regions (1), (2) and (3) indicated in FIG. 7; a statement "The target parking position is too close in the transverse direction. Please set it away from your vehicle." for the regions (4) and (7); a statement "The target parking position is too far in the transverse direction. Please move it closer to your vehicle." for the regions (6) and (9); and a statement "The target parking position is too close. Please set it away from your vehicle." for the region (8).

In this embodiment, if a path is not generated as a result of calculation of a path to a target parking position set in accordance with the position of the parking space frame S in the touch display 16 during the garage parking mode or the parallel parking mode, the positional relationship between the target parking position and the vehicle and the relative angle therebetween are computed, and it is determined on the basis of a result of the computation which one of the regions as indicated in FIGS. 5A and 5B or FIG. 7 the vehicle belongs to in relation to the target parking position. After that, the character and voice information corresponding to the determined region is retrieved from the memory 20 either automatically upon execution of an operation for resetting a target parking position is performed or when the "help" button on the touch display 16 is touched. Then, the information is displayed in characters on the touch display 16, or is read out in a voice via a speaker device.

Thus, in the parking assist apparatus 10 of the embodiment, if a path to a parking position set in accordance with the positioning operation of the parking space frame S is not generated during the garage parking mode or the parallel parking mode, the arrow button switches C that prohibit movements of the parking space frame S and the arrow button switches C that allow movements of the arrow button switches C are displayed in a distinguishable fashion on the touch display 16. Furthermore, the reason why the parking is impossible and the direction to move the parking space frame S in order to reset a target parking position are explained in characters or voice to a vehicle driver.

Therefore, if the parking in a once-set target parking position becomes difficult, the vehicle driver can easily understand visually and auditorily the reason why the parking is difficult and which direction to move or rotate the parking space frame S in order to reset a target parking position in which the vehicle can be parked. In this case, the vehicle driver is prompted to perform the touch operation for that direction, and is therefore aided in performing the positioning operation of the parking space frame S.

Therefore, in the parking assist apparatus 10 of this embodiment, after the parking in a target parking position set in accordance with the positioning operation of the parking space frame S becomes difficult as a path to the target parking position is not generated, the reason why the parking is difficult and the direction to move or rotate the parking space frame S are visually and auditorily indicated to the vehicle driver. This makes it easier for the vehicle driver to accomplish the touch operation of the arrow button switches C needed for moving or rotating the parking space frame S on the touch display 16 in such a direction that parking is possible when resetting a target parking position. Therefore, it becomes possible to promptly reset a target parking position if a path to the presently set target parking position is not generated.

In this embodiment, the parking assist ECU 12, setting a target parking position of the vehicle on an actual road surface in accordance with the position of the parking space frame S in the screen of the touch display 16 specified by a vehicle driver, can be considered to realize a setting device or setting means in the invention. Furthermore, if a path to a parking position set in accordance with the positioning operation of the parking space frame S is not generated during the garage parking mode or the parallel parking mode, the parking assist ECU 12 displays the arrow button switches C that prohibit movements of the parking space frame S and the arrow button switches C that allow movements of the arrow button switches C in a distinguishable fashion in the screen of on the touch display 16, and disables the touch-operation functions of the arrow button switches C that prohibit movements of the parking space frame S. In this respect, the parking assist ECU 12 can be considered to realize an operation aid device or operation aid means in the invention.

Although in the foregoing embodiment, a path to a target parking position specified by the parking space frame S is calculated at every predetermined time, the calculation of a path may be performed every time the parking space frame S is moved in the screen of the touch display 16 by the touch operation of any arrow button switch C. Furthermore, the calculation of a path may be started when a predetermined button switch is touch-operated.

Furthermore, although in the foregoing embodiment, only the automatic steering via the electric motor of the EPS 18 is performed as a parking assist control for moving the vehicle along a path to a target parking position, the invention is not limited so. For example, the driving and stopping of the vehicle may also be automatically performed without the need for a driver's operation. Furthermore, the invention also includes a construction that assists driver's operation by producing voice guidance or displaying assist lines in the screen of the touch display 16.

Still further, in the foregoing embodiment, in order to discriminate the arrow button switches C that prohibit movements of the parking space frame S and the arrow button switches C that allow movements of the parking space frame S, the geometric positional relationship between the position of the vehicle and the target parking position is determined with reference to a map that is divided into rectangular regions as indicated in FIGS. 5A and 5B or FIG. 7. However, the shape of divided regions of the map does not need to be rectangular. That is, the divided regions of the map may have a circular shape, a fan shape or any shape as long as the map is an appropriate map for reference.

Although in the foregoing embodiment, the arrow button switches C are switches provided for moving the parking space frame S in the transverse direction, the longitudinal direction and the rotating directions, the arrow button switches C are not limited to the switches for moving the parking space frame S in these directions. That is, it is possible to further provide arrow button switches for moving the parking space frame S in diagonal directions between the longitudinal direction and the transverse direction, and other directions.

Although in the foregoing embodiment, the display of the arrow button switches C displayable in the screen of the touch display 16 is controlled so as to aid a vehicle driver in moving or rotating the parking space frame S in such a direction that the parking becomes possible, the invention is not limited so. For example, instead of or together with the control of display of the arrow button switches C, a synthesized image for discriminating the parking-possible regions and the parking-impossible regions is superimposed in the screen of the touch display 16 displaying an image taken by the back camera 14, so as to aid in the moving and rotating of the parking space frame S in such a direction that the parking of the vehicle is possible.

Figure 10:
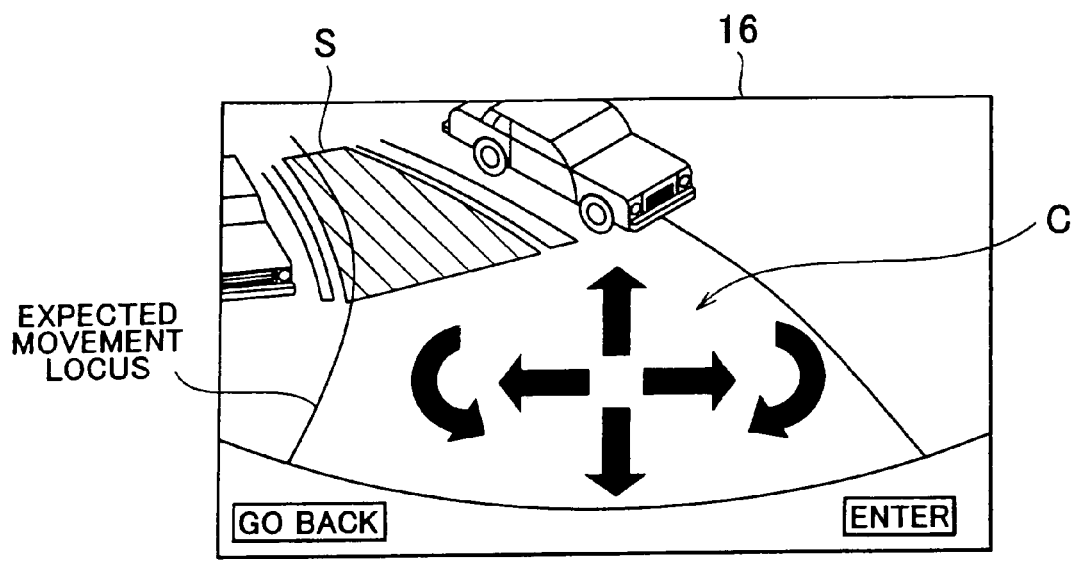
FIG. 10 is a diagram showing an example of the image displayed in the display screen during the garage parking mode of a parking assist apparatus in accordance with a modification of the embodiment of the invention when the vehicle is to be angular-parked diagonally left rearward.
Figure 11:
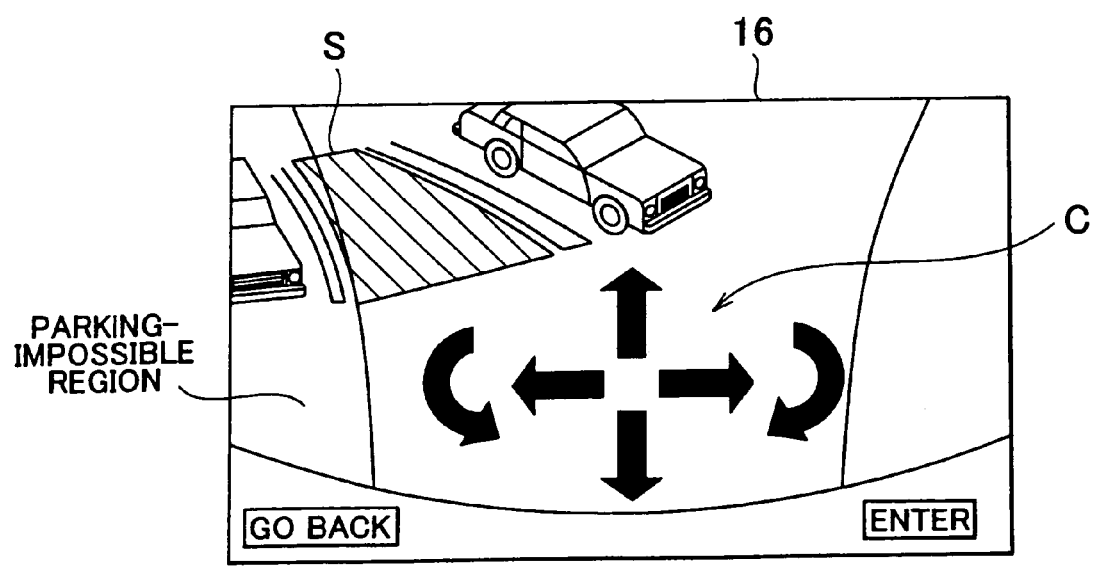
FIG. 11 is a diagram showing an example of the image displayed in the display screen during the garage parking mode of a parking assist apparatus in accordance with a modification of the embodiment of the invention when the vehicle is to be angular-parked diagonally left rearward.

FIGS. 10 and 11 show examples of the display in the screen of the touch display 16 during the garage parking mode when the vehicle is to be angular-parked diagonally left rearward, in a parking assist apparatus in accordance with a modification of the embodiment of the invention. The synthesized images for discriminating a parking-possible region and a parking-impossible region include an image as shown in FIG. 10 which indicates an expected movement locus of an inner turning wheel with the maximum steering angle of the vehicle, or a movement locus of an inner turning wheel which is expected to occur on the assumption that the steering angle of the vehicle will be changed from the present steering angle without generally-termed stationary steering, an image as shown in FIG. 11 in which a parking-impossible region is colored differently from the parking-possible region, or is displayed dimmer than the parking-possible region, etc. Similar to the foregoing embodiment, these modified constructions make it easy for a vehicle driver to visually understand which direction to move or rotate the parking space frame S in order to reset a target parking position in which the vehicle can be parked, and thus aid in the positioning operation of the parking space frame S. Therefore, when resetting a target parking position, the vehicle driver can easily accomplish the touch operation of the arrow button switches C for moving or rotating the parking space frame S on the touch display 16 in such a direction that the parking becomes possible.

Furthermore, in the foregoing embodiment, when a target parking position is to be reset after the parking in the present target parking position set in accordance with the positioning operation of the parking space frame S becomes difficult as a path to the target parking position is not generated, the arrow button switches C that allow movements of the parking space frame S and the arrow button switches C that prohibit movements of the parking space frame S are displayed in a distinguishable fashion in the screen of the touch display 16. However, the invention is not limited so. For example, prior to the calculation of a path to a target parking position that has been set, the arrow button switches C that allow movements of the parking space frame S and the arrow button switches C that prohibit movements of the parking space frame S may be displayed in a distinguishable fashion in the screen of the touch display 16 on the basis of the positional relationship between the position of the vehicle and the target parking position and the relative angle therebetween.

Still further, although in the foregoing embodiment, the reason why a path to a target parking position is not generated and therefore the parking is impossible is explained in characters or voice, the reason may also be visually indicated to the vehicle driver by displaying the positional relationship between the target parking position and the present position of the vehicle in a bird's eye view in the touch display 16.

Furthermore, the foregoing embodiment aids in the operation of moving or rotating the parking space frame S in such a direction that the parking becomes possible, by controlling the display of the arrow button switches C displayable in the screen of the touch display 16, and by explaining, in characters or voice, the reason why a path to the present target parking position is not generated and therefore the vehicle cannot be parked in the position and which direction to move the parking space frame S in order to reset a target parking position. However, it is also possible to carry out one of the control of the display of the arrow button switches C on the touch display 16 and the output of explanatory information. Furthermore, it may be one of the reason why the parking is impossible and which direction to move the parking space frame S in order to reset a target parking position, instead of both, that is output as explanatory information.

As is apparent from the above description, the embodiment makes it easy for a vehicle driver to understand which direction to move the setting display at the time of setting a target parking position in which the vehicle is to be parked, and allows the vehicle driver to easily accomplish the setting operation for the purpose of setting a target parking position.

Furthermore, when a target parking position is to be reset after the parking in the present target parking position has become difficult, the embodiment makes it easy for a vehicle driver to understand which direction to move the setting display. Therefore, the vehicle driver can easily accomplish the setting operation for the purpose of resetting a target parking position.

Still further, according to the foregoing embodiment, when a target parking position is to be set, the operating switches for moving the position of the setting display in an actual screen in such directions that the parking is impossible can be disabled. Therefore, the vehicle driver can easily accomplish the setting operation.

Still further, when a target parking position is to be set, the embodiment is able to visually prompt a vehicle driver to operate an operating switch for such a direction that parking is possible. Therefore, the vehicle driver can easily accomplish the setting operation.

Yet further, when a target parking position is to be set, the embodiment makes it possible for a vehicle driver to visually distinguish a parking-possible region and a parking-impossible region. Therefore, the vehicle driver can easily accomplish the setting operation.

Furthermore, according to the foregoing embodiment, when the parking in a target parking position becomes difficult, it is possible to provide the vehicle driver with explanations about why the parking has become difficult and which direction to shift the target parking position for resetting. While the invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A parking assist apparatus comprising:
   a display device that displays an actual image of surroundings of the vehicle;
   a setting device which displays a setting display that indicates a target parking position of the vehicle on the actual image of the display device, and which sets the target parking position of the vehicle in accordance with a positioning operation of the setting display; and
   an operation aid device that aids in the positioning operation of the setting display in a direction to a parking-possible region when the target parking position is to be set by the setting device.

2. The parking assist apparatus according to claim 1, wherein:
   the setting device culculates a path to the target parking position; and
   the operation aid device aids in the positioning operation of the setting display in the direction to the parking-possible region when the target parking position is to be reset after it is determined that parking the vehicle in the target parking position is difficult through calculation of the path to the target parking position set by the setting device.

3. The parking assist apparatus according to claim 2, wherein the setting device performs the calculation of the path at every predetermined time.

4. The parking assist apparatus according to claim 2, wherein the setting device performs the calculation of the path every time the target parking position is changed by the positioning operation of the setting display.

5. The parking assist apparatus according to claim 2, wherein the setting device has a switch for starting the calculation of the path.

6. The parking assist apparatus according to claim 1, wherein the operation aid device makes effective only a function of an operating switch of moving the position of the setting display in the direction to the parking-possible region, the operating switch being operated by a vehicle driver to move the position of the setting display.

7. The parking assist apparatus according to claim 1 wherein:
   a plurality of operating switches that are operated by the vehicle driver to move the position of the setting display are displayed in a display screen corresponding to directions in which the position of the setting display is moved; and
   among the plurality of operating switches, at least one operating switch for moving the position of the setting display in the direction to the parking-possible region is displayed by the operation aid device with a more emphasis than at least one operating switch for moving the position of the setting display in a direction to a parking-impossible region.

8. The parking assist apparatus according to claim 7, wherein the operation aid device displays, on the actual image, the at least one operating switch for moving the position of the setting display in the direction to the parking-possible region in a first color, and the at least one operating switch for moving the position of the setting display in the direction to the parking-impossible region in a second color that is different from the first color.

9. The parking assist apparatus according to claim 8, wherein the operation aid device disables an operation of the at least one operating switch for moving the position of the setting display in the direction to the parking-impossible region.

10. The parking assist apparatus according to claim 9, wherein the operation aid device makes effective the disabled operation of the at least one operating switch after the position of the setting display is moved to a parking-possible position.

11. The parking assist apparatus according to claim 7, wherein the operation aid device erases the at least one operating switch for moving the position of the setting display in the direction to the parking-impossible region from the actual image.

12. The parking assist apparatus according to claim 1, wherein the operation aid device superimposes a synthesized image for discriminating the parking-possible region and a parking-impossible region, on the actual image.

13. The parking assist apparatus according to claim 12, wherein the operation aid device displays, on the actual image, an expected locus of an inner turning wheel which is expected to occur if the vehicle is moved with a maximum steering angle of the vehicle.

14. The parking assist apparatus according to claim 12, wherein the operation aid device displays the parking-possible region and the parking-impossible region in different colors.

15. The parking assist apparatus according to claim 1, wherein if it is determined that it is difficult to park the vehicle in the target parking position set by the setting device, the operation aid device outputs explanatory information that aids in the positioning operation of the setting display in the direction to the parking-possible region in accordance with the set target parking position.

16. The parking assist apparatus according to claim 15, wherein if it is determined that it is difficult to park the vehicle in the target parking position set by the setting device, the operation aid device indicates to a vehicle driver at least one of i) reason why it is difficult to park the vehicle in the target parking position, and ii) an operation of the setting display for setting the target parking position at a parking-possible position.

17. The parking assist apparatus according to claim 1, wherein the operation aid device displays the setting display in a third color if it is determined that it is difficult to park the vehicle in the target parking position, and displays the setting display in a forth color that is different from the third color if it is determined that it is possible to park the vehicle in the target parking position.

18. The parking assist apparatus according to claim 1, wherein the setting display includes a parking space frame that is displayed on the actual image.

19. A parking assist apparatus comprising:
   display means for displaying an actual image of surroundings of the vehicle;
   setting means for displaying a setting display that indicates a target parking position of the vehicle on the actual image of the display means, and setting the target parking position of the vehicle in accordance with a positioning operation of the setting display; and
   operating aid means for aiding in the positioning operation of the setting display in a direction to a parking-possible region when the target parking position is to be set by the setting means.

20. A parking assist method comprising:
a first step of displaying an actual image of surroundings of the vehicle;
a second step of setting a target parking position where the vehicle is to be parked in accordance with a positioning operation of a setting display shown on the actual image of surroundings of the vehicle; and
a third step of aiding in the positioning operation of the setting display in a direction to a parking-possible region when the target parking position is to be set.

* * * * *